US012678809B2

(12) United States Patent
Fu et al.

(10) Patent No.: US 12,678,809 B2
(45) Date of Patent: Jul. 14, 2026

(54) WATER OUTLET DEVICE WITH COLD WATER DISCHARGING FUNCTION

(71) Applicant: Xiamen Solex High-Tech Industries Co., Ltd., Xiamen (CN)

(72) Inventors: Qingxin Fu, Xiamen (CN); Zhichun Lin, Xiamen (CN); Donghai Chen, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 184 days.

(21) Appl. No.: 18/786,699

(22) Filed: Jul. 29, 2024

(65) Prior Publication Data

US 2025/0114807 A1 Apr. 10, 2025

(30) Foreign Application Priority Data

Oct. 9, 2023 (CN) ......................... 202322699563.1

(51) Int. Cl.
*B05B 1/30* (2006.01)
*B05B 1/18* (2006.01)
*B05B 12/10* (2006.01)

(52) U.S. Cl.
CPC .............. *B05B 1/3026* (2013.01); *B05B 1/18* (2013.01); *B05B 12/10* (2013.01)

(58) Field of Classification Search
CPC .......... B05B 1/3026; B05B 1/18; B05B 12/10
USPC ............................................................ 239/75
See application file for complete search history.

(56) References Cited

U.S. PATENT DOCUMENTS

| | | | | |
|---|---|---|---|---|
| 4,877,186 | A * | 10/1989 | Scholl | B60S 1/481 239/284.1 |
| 2019/0234054 | A1* | 8/2019 | Strushensky | B05B 12/10 |
| 2025/0114807 | A1* | 4/2025 | Fu | B05B 12/10 |

* cited by examiner

*Primary Examiner* — Christopher S Kim
(74) *Attorney, Agent, or Firm* — COOPER LEGAL GROUP LLC

(57) ABSTRACT

A water outlet device with a cold water discharging function includes a water outlet device body, an operating member, and a switching valve. The water outlet device body comprises a water outlet channel and a cold water discharging channel. The switching valve is disposed at a communicating junction of the water inlet port of the water outlet device body with the water outlet channel and the cold water discharging channel. The switching valve can increase a water passing area of a first communicating junction between the cold water discharging channel and the water inlet port and simultaneously decrease a water passing area of a second communicating junction between the water outlet channel and the water inlet port. A temperature sensing valve assembly is disposed in the cold water discharging channel and is configured to close the cold water discharging channel when a water temperature reaches a specific temperature.

14 Claims, 7 Drawing Sheets

WATER OUTLET DEVICE WITH COLD WATER DISCHARGING FUNCTION

RELATED APPLICATIONS

This application claims priority to Chinese patent application number 202322699563.1, filed on Oct. 9, 2023. Chinese patent application number 202322699563.1 is incorporated herein by reference.

FIELD OF THE DISCLOSURE

The present disclosure relates to a water outlet device, in particular to a water outlet device with a cold water discharging function.

BACKGROUND OF THE DISCLOSURE

In current practice, users typically need to first flush out residual cold water from the shower equipment pipes before showering. The users wait until warm water starts flowing before beginning their showers. The traditional method of discharging cold water involves holding the hand-held shower, directing the hand-held shower toward a wall or floor, and then opening the valve. After some time, the users use their hands to feel the water temperature. Once the water temperature is appropriate, the users aim the hand-held shower toward their bodies and start showering.

Therefore, some have designed specialized cold water discharge shower bars. These shower bars incorporate dedicated cold water discharge channels within them. The users manually activate the cold water discharge function before starting their showers. Once the cold water discharge is complete, the users proceed with their regular showering routines. However, with this method, after the cold water discharge ends, the hand-held shower is in a state where water flow is stopped. This can lead the users to mistakenly believe that the hand-held shower has not been turned on, causing confusion in use functionality. There is a lack of reminders to inform the users when the cold water discharge function has ended. Furthermore, if the hand-held shower remains in a cold water discharge state for an extended period without switching to a normal water flow state, hot water entering from an inlet can accumulate in the cold water discharge channel, causing back pressure. Excessive pressure can lead to damage to the hand-held shower.

BRIEF SUMMARY OF THE DISCLOSURE

The technical problem to be solved by the present disclosure is to provide a water outlet device with a cold water discharging function that can remind users when the cold water discharge has ended.

In order to solve the above technical problems, the present disclosure provides a water outlet device with a cold water discharging function, comprising: a water outlet device body, an operating member disposed on the water outlet device body, and a switching valve configured to cooperate with the operating member.

The water outlet device body comprises a water outlet channel and a cold water discharging channel. Each of the water outlet channel and the cold water discharging channel is respectively connected to a water inlet port and a water outlet port of the water outlet device body, and the switching valve is disposed at a communicating junction of the water inlet port of the water outlet device body with the water outlet channel and the cold water discharging channel. The switching valve is configured to increase a water passing area of a first communicating junction between the cold water discharging channel and the water inlet port and simultaneously decrease a water passing area of a second communicating junction between the water outlet channel and the water inlet port.

A temperature sensing valve assembly is disposed in the cold water discharging channel and is configured to close the cold water discharging channel when a water temperature reaches a specific temperature.

In a preferred embodiment, the temperature sensing valve assembly comprises a temperature sensing element and a valve core operatively coupled to an extendible end of the temperature sensing element along an elongation direction of the extendible end, and when the water temperature in the cold water discharging channel rises, the extendible end of the temperature sensing element pushes the valve core from a first position to a second position.

In a preferred embodiment, the water outlet device further comprises a water pressure balance chamber. The temperature sensing valve assembly comprises a water pressure balance channel in communication with the cold water discharging channel and the water pressure balance chamber, so that water in the cold water discharging channel flows into the water pressure balance chamber through the water pressure balance channel to balance water pressure on two ends of the valve core.

In a preferred embodiment, the water pressure balance channel is a through-hole on the valve core or a gap between the temperature sensing element and the valve core, and the water pressure balance chamber is only connected to the water pressure balance channel.

In a preferred embodiment, the temperature sensing valve assembly further comprises a resetting spring sleeved on the valve core. Along a water flow direction, the resetting spring is positioned upstream of the valve core. The temperature sensing element is positioned downstream of the valve core, and the valve core is located between the resetting spring and the temperature sensing element. When the valve core moves from the first position to the second position, the resetting spring accumulates an elastic resetting force.

In a preferred embodiment, a first sealing ring is sleeved on the valve core, and when the valve core moves to the second position, the first sealing ring abuts an inner wall of the cold water discharging channel to terminate a connection between the cold water discharging channel and the water outlet port.

In a preferred embodiment, a first core is provided in the water outlet device body, and the first core comprises a first water passing port configured to be in communication with the water inlet port and the cold water discharging channel and a second water passing port configured to be in communication with the water inlet port and the water outlet channel.

In a preferred embodiment, the first core has a chamber for receiving the switching valve, and the first water passing port and the second water passing port are located on a side wall of the chamber.

In a preferred embodiment, the switching valve comprises a first sealing member, and the switching valve is slidingly connected to the first core. When the first sealing member is misaligned with the first water passing port to enable the water inlet port to be in communication with the cold water discharging channel, the first sealing member incompletely seals the second water passing port.

In a preferred embodiment, the first sealing member is a first protrusion extending radially outward, and the switching valve is driven by the operating member to be configured to drive the first protrusion to alternatively be at a first position or a second position.

When the first protrusion is moved to the first position, the first protrusion is misaligned with the second water passing port and forms a gap fit with the first water passing port. When the first protrusion is moved to the second position, the first protrusion is misaligned with the first water passing port and forms a gap fit with the second water passing port.

In a preferred embodiment, the switching valve comprises two second protrusions located on two sides of the first protrusion along a movement direction of the switching valve. The two second protrusions are spaced apart from each other, and the two second protrusions hermetically abut an inner wall of the first core through third sealing rings.

In a preferred embodiment, the water outlet device body further comprises a second core. The first core and the second core are sequentially arranged along a water flow direction and are spliced together to form a cavity for defining the water outlet channel and the cold water discharging channel. A first connector and a second connector are disposed in the cavity along the water flow direction, and the first connector and second connector are spliced together to form the cold water discharging channel. The water outlet channel is defined between outer walls of the first connector and second connector and an inner wall of the cavity.

In a preferred embodiment, the water outlet device further comprises a positioning assembly, and the operating member is swingably connected to the water outlet device body. The operating member comprises at least two positioning matching members configured to cooperate with the positioning assembly, and the positioning assembly is positioned to different positioning matching members of the at least two positioning matching members when the operating member swings.

In a preferred embodiment, the positioning assembly comprises a positioning pin and a positioning spring, and the water outlet device body comprises a receiving groove. The positioning spring is disposed in the receiving groove. A first end of the positioning spring abuts the receiving groove, and a second end of the positioning spring abuts the positioning pin. The positioning pin is at least partially disposed in the receiving groove, and the at least two positioning matching members are positioning grooves.

Compared with the existing techniques, the technical solution has the following advantages.

1. The present disclosure provides the water outlet device with the cold water discharging function, and movement of the switching valve driven by the operating member can open the cold water discharging channel while not completely closing the water outlet channel. In addition, the temperature sensing valve assembly is disposed in the cold water discharging channel to completely close the cold water discharging channel after a cold water discharging process is completed. This way, even if the cold water discharging channel is completely closed, the water outlet channel still maintains a gap connection with the water inlet port, resulting in a trickle of water from the water outlet device. The trickle of water serves as a reminder for the user to fully open the water outlet channel using the switching valve, thereby restoring a normal water flow function. Additionally, this can prevent the user from forgetting to open the water outlet channel after the cold water discharging process is completed, which would otherwise cause a large amount of water to accumulate in the cold water discharging channel, leading to pressure buildup and potential damage to the water outlet device.
2. The present disclosure provides the water outlet device with the cold water discharging function. The temperature sensing valve assembly comprises the water pressure balance channel in communication with the cold water discharging channel and the water pressure balance chamber, so that water in the cold water discharging channel flows into the water pressure balance chamber through the water pressure balance channel to balance the water pressure on the two ends of the valve core. In this way, the valve core only needs to overcome the elastic resetting force of the resetting spring during its movement. This allows the extendible end of the temperature sensing element to quickly push the valve core when the water temperature rises, thereby increasing sensitivity of the entire temperature sensing valve assembly. Furthermore, because the valve core is in a state of water pressure balance at both ends, the temperature sensing element is effectively prevented from enduring prolonged water pressure loads, thereby enhancing the lifespan of the temperature sensing element.

DETAILED DESCRIPTION OF THE EMBODIMENTS

Figure 1:
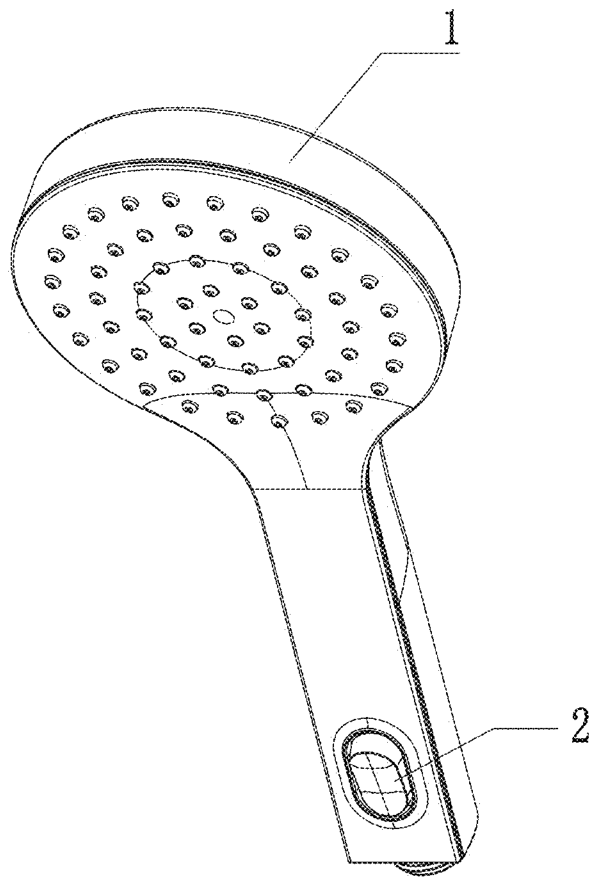
FIG. 1 is a schematic illustration of a preferred embodiment of the present disclosure.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms “upper”, “lower”, “inner”, “outer”, “top end”, “bottom end”, etc. indicate the orientation or positional relationship based on the orientation shown in the drawings. The positional relationship is only for the convenience of describing the present disclosure and simplifying the description, rather than indicating or implying that the referenced device or element must have a specific orientation, be constructed, and be operated in a specific orientation. Therefore, the positional relationship should not be understood as a limitation of the present disclosure. In addition, the terms "first" and "second" are only used for descriptive purposes and should not be understood as indicating or implying relative importance.

In the description of the present disclosure, it should be noted that the terms "installed", "provided with", "sleeved/connected", "connected", etc., should be understood broadly. For example, "connected" can be a wall hanging connection, a detachable connection, or an integral connection, a mechanical connection, an electrical connection, a direct connection, or an indirect connection through an intermediate medium, and it can be a connection in two members. For those of ordinary skill in the art, the specific meaning of the above terms in the present disclosure can be understood under specific conditions.

Figure 2:
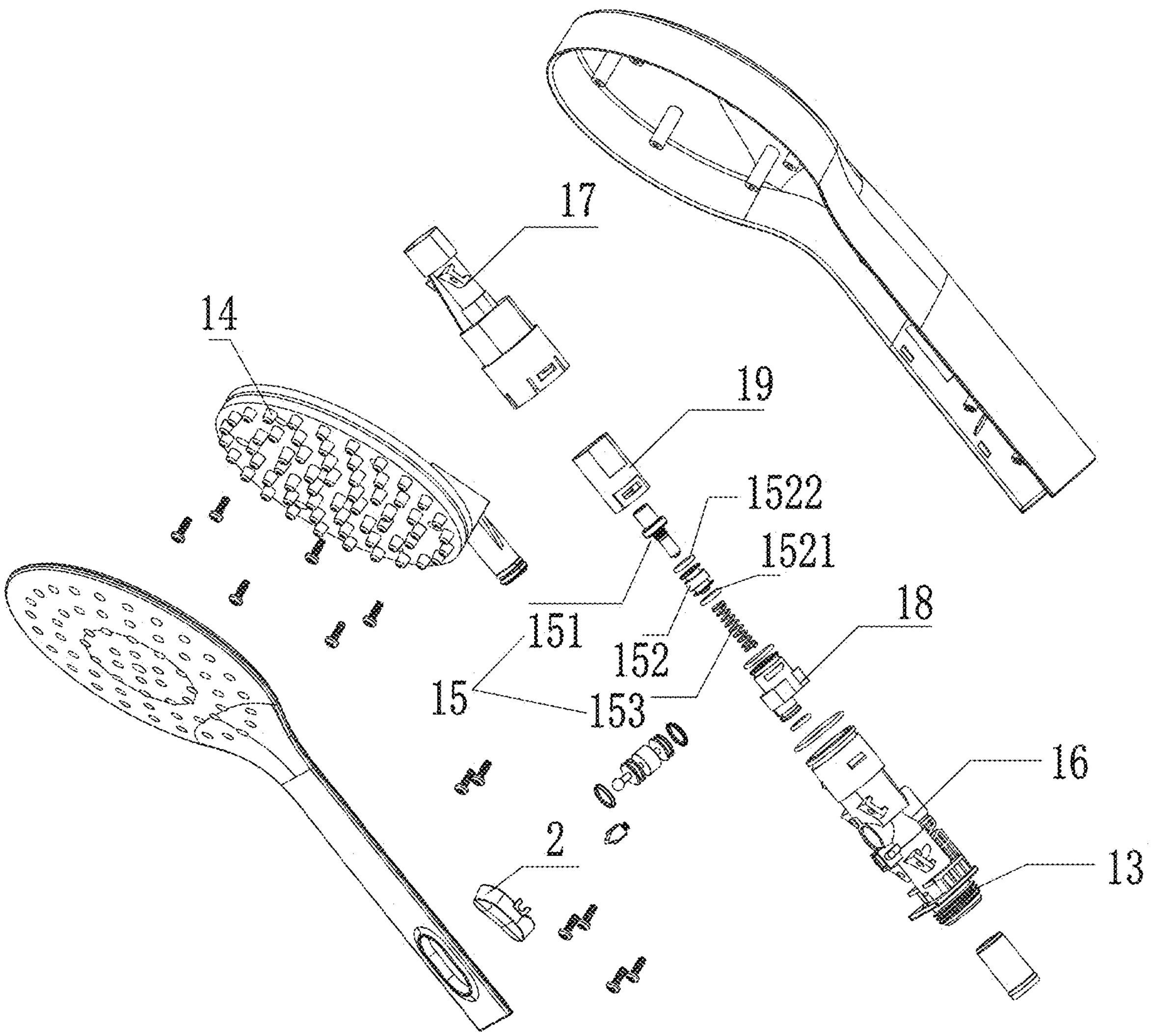
FIG. 2 is an exploded view of the preferred embodiment of the present disclosure.
Figure 3:
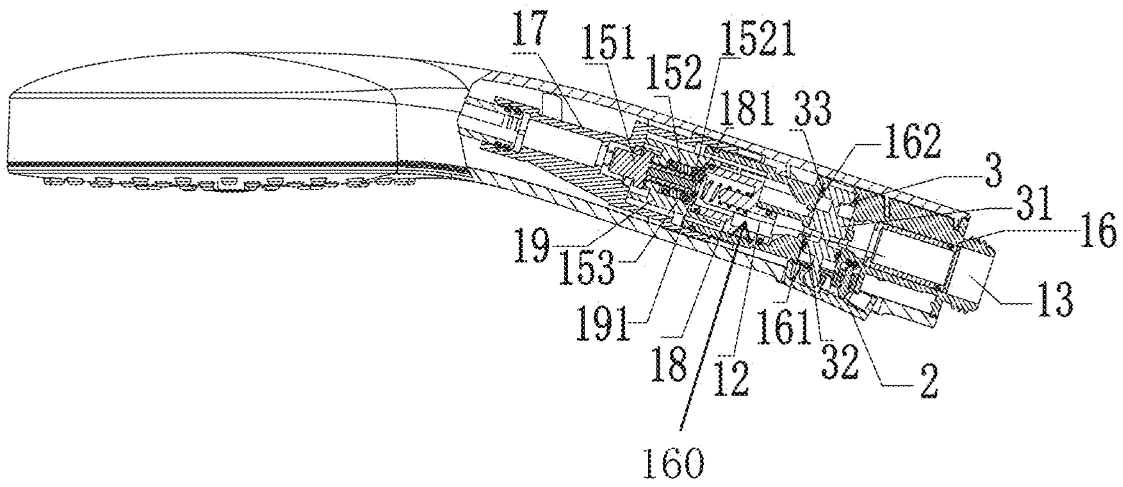
FIG. 3 is a cross-sectional view in a cold water discharging state of the preferred embodiment of the present disclosure.
Figure 4:
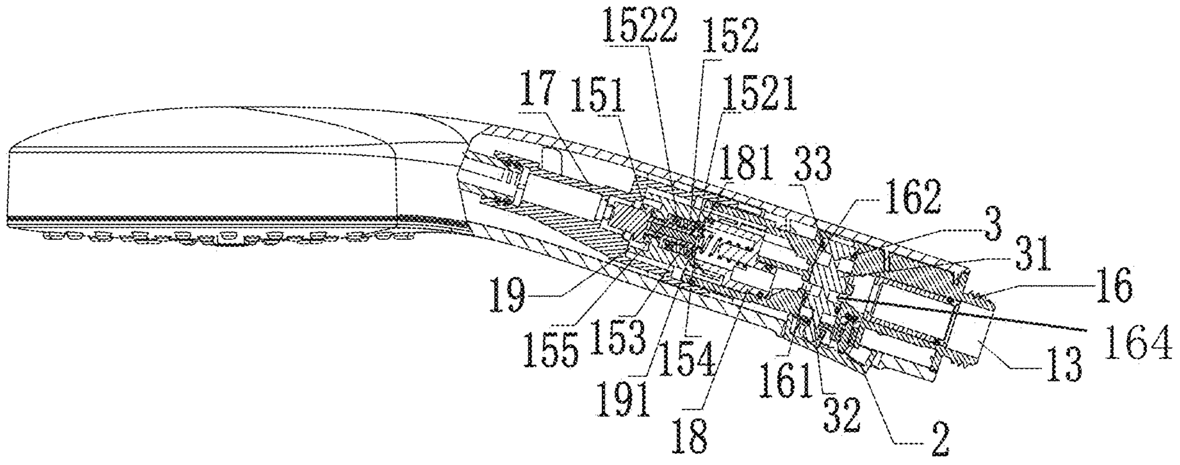
FIG. 4 is a schematic diagram of the preferred embodiment of the present disclosure, showing movement of a valve core from a first position to a second position.
Figure 5:
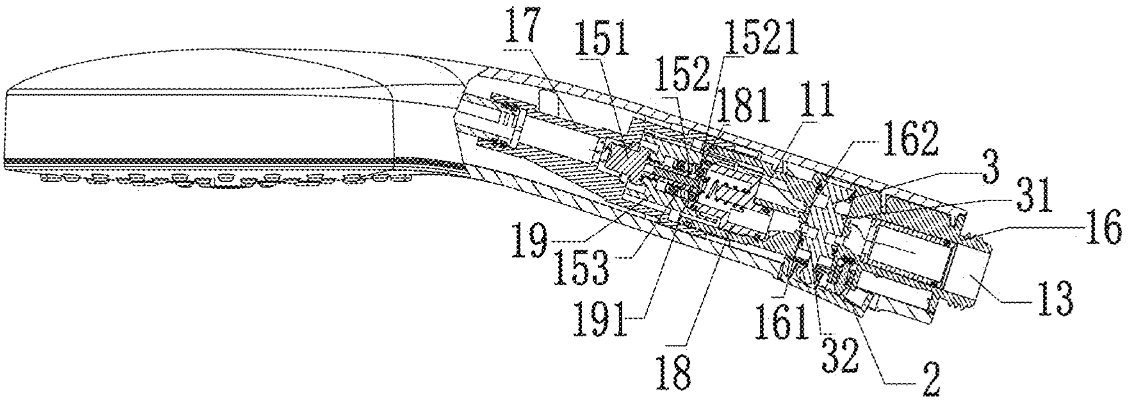
FIG. 5 is a schematic diagram of the preferred embodiment of the present disclosure, in a trickle of water state after the cold water discharge has ended.
Figure 6:
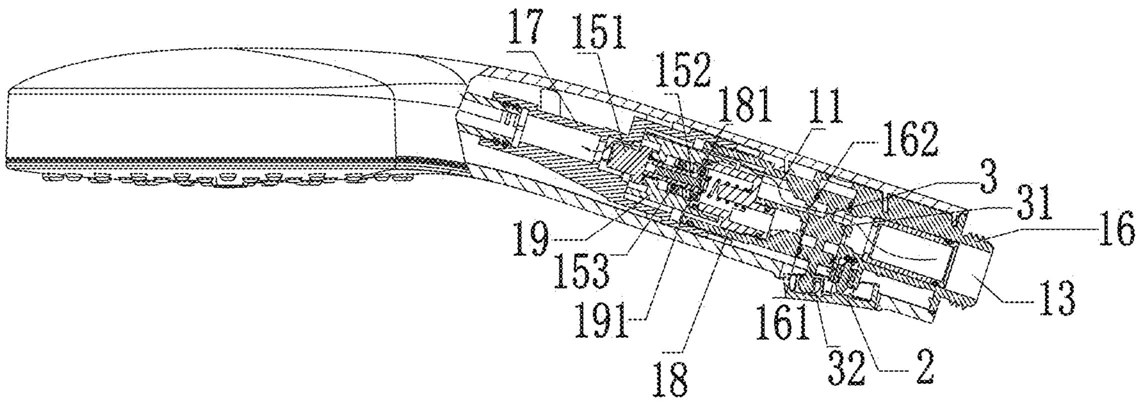
FIG. 6 is a schematic diagram of the preferred embodiment of the present disclosure in a showering state.
Figure 7:
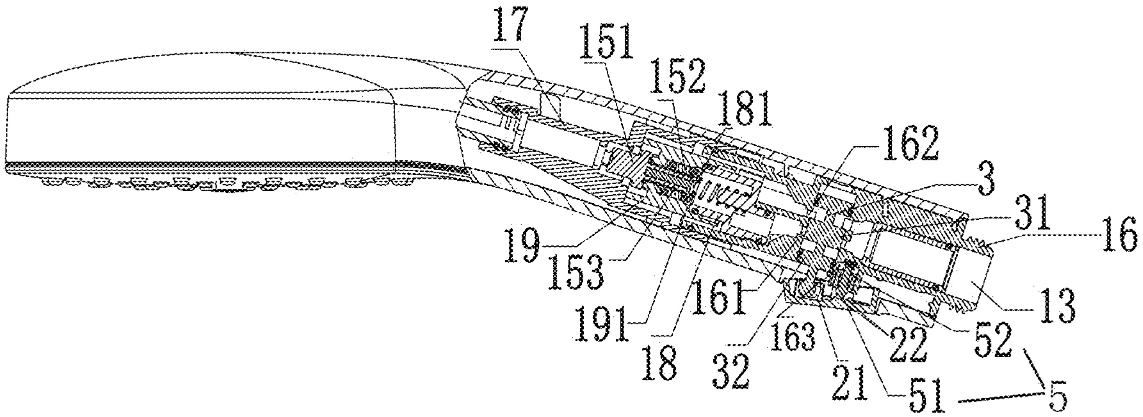
FIG. 7 is a schematic diagram of the preferred embodiment of the present disclosure, showing an initial state after showering has ended.

Referring to FIG. 1-FIG. 7, the present embodiment provides a hand-held shower with a cold water discharging function, and the hand-held shower comprises a shower body 1, an operating member 2 disposed on the shower body 1, and a switching valve 3 configured to cooperate with the operating member 2.

The shower body 1 comprises a water outlet channel 11 and a cold water discharging channel 12, and each of the water outlet channel 11 and the cold water discharging channel 12 is respectively connected to a water inlet port 13 and a water outlet port 14 of the shower body 1. The switching valve 3 is disposed at a communicating junction of the water inlet port 13 of the shower body 1 with the water outlet channel 11 and the cold water discharging channel 12. The switching valve 3 is configured to increase a water passing area of a first communicating junction between the cold water discharging channel 12 and the water inlet port 13 and simultaneously decrease a water passing area of a second communicating junction between the water outlet channel 11 and the water inlet port 13, and the switching valve 3 enables the water outlet channel 11 to be maintained to be in communication with the water inlet port 13. A temperature sensing valve assembly 15 is disposed in the cold water discharging channel 12 and is configured to close the cold water discharging channel 12 when a water temperature reaches a specific temperature.

In the above-described water outlet device (i.e., the hand-held shower) with the cold water discharging function, movement of the switching valve 3 driven by the operating member 2 can open the cold water discharging channel 12 while not completely closing the water outlet channel 11. In addition, the temperature sensing valve assembly 15 is disposed in the cold water discharging channel 12 to completely close the cold water discharging channel 12 after a cold water discharging process is completed. This way, even if the cold water discharging channel 12 is completely closed, the water outlet channel 11 still maintains a gap connection with the water inlet port 13, resulting in a trickle of water from the hand-held shower. The trickle of water serves as a reminder for the user to fully open the water outlet channel 11 using the switching valve 3, thereby restoring a normal water flow function. Additionally, this can prevent the user from forgetting to open the water outlet channel 11 after the cold water discharging process is completed, which would otherwise cause a large amount of water to accumulate in the cold water discharging channel 12, leading to pressure buildup and potential damage to the hand-held shower.

In this embodiment, to ensure that the switching valve 3 does not completely close the water outlet channel 11, a first core 16 is provided in the shower body 1. The first core 16 comprises a first water passing port 161 configured to be in communication with the water inlet port 13 and the cold water discharging channel 12 and a second water passing port 162 configured to be in communication with the water inlet port 13 and the water outlet channel 11. In this way, as long as the switching valve 3 can fully open the first water passing port 161 while decreasing but not completely closing a water passage area of the second water passing port 162 during a movement process of the switching valve 3, water flow will flow from the second water passing port 162 through the water outlet channel 11, resulting in the trickle of water from the water outlet port 14.

To achieve the aforementioned coordination effect, the first core 16 has a chamber 164 for receiving the switching valve 3, and the first water passing port 161 and the second water passing port 162 are located on a side wall of the chamber 164. The switching valve 3 has a first protrusion 31 extending radially outward. The switching valve 3 is driven by the operating member 2 to be configured to drive the first protrusion 31 to alternatively be at a first position or a second position. When the first protrusion 31 is moved to the first position, the first protrusion 31 is misaligned with the second water passing port 162 and forms a gap fit with the first water passing port 161. When the first protrusion 31 is moved to the second position, the first protrusion 31 is misaligned with the first water passing port 161 and forms a gap fit with the second water passing port 162.

By using the first protrusion 31 to partially obstruct the water passing port (i.e., the first water passing port 161 or the second water passing port 162), the water passing area of the water passing port is reduced. Since the first protrusion 31 does not have a sealing ring, it cannot achieve a complete seal. This ensures that the second water passing port 162 is never fully closed, maintaining a continuous connection between the water outlet channel 11 and the water inlet port 13.

To prevent water from leaking out from an upper end and a lower end of the chamber 164, the switching valve 3 comprises two second protrusions 32 located on two sides of the first protrusion 31 along a movement direction of the switching valve 3. The two second protrusions 32 are spaced apart from each other, and the two second protrusions 32 hermetically abut an inner wall of the first core 16 through third sealing rings 33. This design ensures that the water entering the chamber 164 from the water inlet port 13 can only flow out through the first water passing port 161 and the second water passing port 162.

After the first water passing port 161 and the second water passing port 162 are provided, the shower body 1 further requires two separated channels: the cold water discharging channel 12 independently connected to the first water passing port 161 and the water outlet channel 11 independently connected to the second water passing port 162. To establish the two separated channels, the shower body 1 further comprises a second core 17. The first core 16 and the second core 17 are sequentially arranged along a water flow direction and are spliced together through a plug-in sealing connection method to form a cavity 160 for defining the water outlet channel 11 and the cold water discharging channel 12. A first connector 18 and a second connector 19 are disposed in the cavity along a water outlet direction (i.e., the water flow direction). The first connector 18 and second connector 19 are also assembled through a plug-in sealing connection method to form the cold water discharging channel 12. The water outlet channel 11 is defined between outer walls of the first connector 18 and second connector 19 and an inner wall of the cavity.

Additionally, a side of the second connector 19 facing the first connector 18 has a step surface 191, and an end face of the first connector 18 abuts the step surface 191, so that a water-sealing step 181 is defined on the end face of the first connector 18 and the water-sealing step 181 is configured to cooperate with the temperature sensing valve assembly 15. When a sealing ring (i.e., a first sealing ring 1521) of the temperature sensing valve assembly 15 abuts the water-sealing step 181, the cold water discharging channel 12 can be completely closed.

Therefore, the temperature sensing valve assembly 15 comprises a temperature sensing element 151 and a valve core 152 operatively coupled to an extendible end of the temperature sensing element 151 along an elongation direction of the extendible end. When the water temperature in the cold water discharging channel 12 rises, the extendible end of the temperature sensing element 151 pushes the valve core 152 from the first position to the second position. When the valve core 152 is at the second position, the first sealing ring 1521 on the valve core 152 abuts the water-sealing step 181. In addition, after the water is turned off, when the water temperature decreases in the cold water discharging channel 12, the extendible end of the temperature sensing element 151 retracts. At this time, the valve core 152 does not automatically reset. To enable the valve core 152 to be reset as well, the temperature sensing valve assembly 15 further comprises a resetting spring 153 sleeved on the valve core 152. Along the water flow direction, the resetting spring 153 is positioned upstream of the valve core 152, the temperature sensing element 151 is positioned downstream of the valve core 152, and the valve core 152 is located between the resetting spring 153 and the temperature sensing element 151. When the valve core 152 moves from the first position to the second position, the resetting spring 153 accumulates an elastic resetting force. Therefore, after the water is turned off, the elastic resetting force of the resetting spring 153 is released, which allows the valve core 152 to be reset.

The temperature sensing valve assembly 15 further comprises a water pressure balance channel 154. The second connector 19, the temperature sensing element 151, and a second sealing ring 1522 on the valve core 152 enclose a water pressure balance chamber 155. The water flow from the cold water discharging channel 12 can enter the water pressure balance chamber 155 through the water pressure balance channel 154, which makes two ends of the valve core 152 subjected to equal water pressure. Because the water pressure at the two ends of the valve core 152 is equal and pressure areas at the two ends of the valve core 152 are also equal, pressure acting on the two ends of the valve core 152 is balanced. This prevents water pressure changes from affecting the temperature sensing element 151, which only responds to the elastic resetting force of the resetting spring 153. This design effectively reduces a response time of cold water discharge, especially noticeable under high-pressure conditions, and enhances longevity of the temperature sensing element 151. In this embodiment, the water pressure balance channel 154 is a gap between the temperature sensing element 151 and the valve core 152. As a simple alternative to this embodiment, the water pressure balance channel 154 can also be implemented as a through-hole on the valve core 152.

In this embodiment, the operating member 2 is a lever-type switch, and the operating member 2 is pivotally connected to the shower body 1. One end of the operating member 2 has a connecting cavity 21, which is a spherical cavity. The switching valve 3 has a spherical connecting part, which is buckled to the connecting cavity 21. The operating member 2 comprises a plurality of positioning grooves 22 adjacent to the connecting cavity 21. One end of a positioning assembly 5 is disposed inside the shower body 1, and the other end of the positioning assembly 5 is disposed in a corresponding one of the plurality of positioning grooves 22. When the operating member 2 swings, the positioning assembly 5 moves between different positioning groove 22 of the plurality of positioning grooves 22. The positioning assembly 5 comprises a positioning pin 51 and a positioning spring 52. The shower body 1 has a receiving groove 163 where the positioning spring 52 is placed. One end of the positioning spring 52 abuts the receiving groove 163, and the other end of the positioning spring 52 abuts the positioning pin 51. One end of the positioning pin 51 is disposed in the receiving groove 163, and the other end of the positioning pin 51 is at least partially disposed in the corresponding one of the plurality of positioning grooves 22. A top of the positioning pin 51 is spherical, and the plurality of positioning grooves 22 define a wave structure comprising a plurality of curved surfaces, so that when the positioning pin 51 moves between different positioning grooves 22, the positioning pin 51 can be moved in a smooth overdrive without a sense of jamming.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A water outlet device with a cold water discharging function, comprising:

a water outlet device body, an operating member disposed on the water outlet device body, and a switching valve configured to cooperate with the operating member, wherein:

the water outlet device body comprises a water outlet channel and a cold water discharging channel, each of the water outlet channel and the cold water discharging channel is respectively connected to a water inlet port and a water outlet port of the water outlet device body, the switching valve is disposed at a communicating junction of the water inlet port of the water outlet device body with the water outlet channel and the cold water discharging channel, the switching valve is configured to increase a water passing area of a first communicating junction between the cold water discharging channel and the water inlet port and simultaneously decrease a water passing area of a second communicating junction between the water outlet channel and the water inlet port, and a temperature sensing valve assembly is disposed in the cold water discharging channel and is configured to close the cold water discharging channel when a water temperature reaches a specific temperature.

2. The water outlet device with the cold water discharging function according to claim 1, wherein:

the temperature sensing valve assembly comprises a temperature sensing element and a valve core operatively coupled to an extendible end of the temperature sensing element along an elongation direction of the extendible end, and when the water temperature in the cold water discharging channel rises, the extendible end of the temperature sensing element pushes the valve core from a first position to a second position.

3. The water outlet device with the cold water discharging function according to claim 2, wherein:

the water outlet device further comprises a water pressure balance chamber, and the temperature sensing valve assembly comprises a water pressure balance channel in communication with the cold water discharging channel and the water pressure balance chamber, so that water in the cold water discharging channel flows into the water pressure balance chamber through the water pressure balance channel to balance water pressure on two ends of the valve core.

4. The water outlet device with the cold water discharging function according to claim 3, wherein:

the water pressure balance channel is a through-hole on the valve core or a gap between the temperature sensing element and the valve core, and the water pressure balance chamber is only connected to the water pressure balance channel.

5. The water outlet device with the cold water discharging function according to claim 2, wherein:

the temperature sensing valve assembly further comprises a resetting spring sleeved on the valve core, along a water flow direction, the resetting spring is positioned upstream of the valve core, the temperature sensing element is positioned downstream of the valve core, and the valve core is located between the resetting spring and the temperature sensing element, and when the valve core moves from the first position to the second position, the resetting spring accumulates an elastic resetting force.

6. The water outlet device with the cold water discharging function according to claim 2, wherein:

a first sealing ring is sleeved on the valve core, and when the valve core moves to the second position, the first sealing ring abuts an inner wall of the cold water discharging channel to terminate a connection between the cold water discharging channel and the water outlet port.

7. The water outlet device with the cold water discharging function according to claim 1, wherein:

a first core is provided in the water outlet device body, and the first core comprises a first water passing port configured to be in communication with the water inlet port and the cold water discharging channel and a second water passing port configured to be in communication with the water inlet port and the water outlet channel.

8. The water outlet device with the cold water discharging function according to claim 7, wherein:

the first core has a chamber for receiving the switching valve, and the first water passing port and the second water passing port are located on a side wall of the chamber.

9. The water outlet device with the cold water discharging function according to claim 8, wherein:

the switching valve comprises a first sealing member, the switching valve is slidingly connected to the first core, and when the first sealing member is misaligned with the first water passing port to enable the water inlet port to be in communication with the cold water discharging channel, the first sealing member incompletely seals the second water passing port.

10. The water outlet device with the cold water discharging function according to claim 9, wherein:

the first sealing member is a first protrusion extending radially outward, the switching valve is driven by the operating member to be configured to drive the first protrusion to alternatively be at a first position or a second position, when the first protrusion is moved to the first position, the first protrusion is misaligned with the second water passing port and forms a gap fit with the first water passing port, and when the first protrusion is moved to the second position, the first protrusion is misaligned with the first water passing port and forms a gap fit with the second water passing port.

11. The water outlet device with the cold water discharging function according to claim 10, wherein:

the switching valve comprises two second protrusions located on two sides of the first protrusion along a movement direction of the switching valve, the two second protrusions are spaced apart from each other, and the two second protrusions hermetically abut an inner wall of the first core through third sealing rings.

12. The water outlet device with the cold water discharging function according to claim 7, wherein:

the water outlet device body further comprises a second core, the first core and the second core are sequentially arranged along a water flow direction and are spliced together to form a cavity for defining the water outlet channel and the cold water discharging channel, a first connector and a second connector are disposed in the cavity along the water flow direction, the first connector and second connector are spliced together to form the cold water discharging channel, and the water outlet channel is defined between outer walls of the first connector and second connector and an inner wall of the cavity.

13. The water outlet device with the cold water discharging function according to claim 1, wherein:

the water outlet device further comprises a positioning assembly, the operating member is swingably connected to the water outlet device body, the operating member comprises at least two positioning matching members configured to cooperate with the positioning assembly, and the positioning assembly is positioned to different positioning matching members of the at least two positioning matching members when the operating member swings.

14. The water outlet device with the cold water discharging function according to claim 13, wherein:

the positioning assembly comprises a positioning pin and a positioning spring, the water outlet device body comprises a receiving groove, the positioning spring is disposed in the receiving groove, a first end of the positioning spring abuts the receiving groove, a second end of the positioning spring abuts the positioning pin, the positioning pin is at least partially disposed in the receiving groove, and the at least two positioning matching members are positioning grooves.

* * * * *